US010604066B2

United States Patent
Brusco

(10) Patent No.: US 10,604,066 B2
(45) Date of Patent: Mar. 31, 2020

(54) INDICATOR SYSTEM FOR VEHICLE POWER

(71) Applicant: Thunder Power New Energy Vehicle Development Company Limited, Central (HK)

(72) Inventor: Massimiliano Brusco, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/466,548

(22) Filed: Mar. 22, 2017

(65) Prior Publication Data

US 2018/0065544 A1  Mar. 8, 2018

Related U.S. Application Data

(60) Provisional application No. 62/384,298, filed on Sep. 7, 2016.

(51) Int. Cl.
| | |
|---|---|
| *B60Q 1/50* | (2006.01) |
| *B60L 1/14* | (2006.01) |
| *B60L 58/12* | (2019.01) |
| *B60L 58/13* | (2019.01) |

(52) U.S. Cl.
CPC .............. *B60Q 1/50* (2013.01); *B60L 1/14* (2013.01); *B60L 58/12* (2019.02); *B60L 58/13* (2019.02); *B60L 2250/16* (2013.01)

(58) Field of Classification Search
CPC . B60Q 1/50; G01R 31/3606; F02N 2200/061; B60L 2250/16
See application file for complete search history.

(56) References Cited

U.S. PATENT DOCUMENTS

| | | | |
|---|---|---|---|
| 5,210,624 A | * | 5/1993 | Matsumoto ........ G02B 27/0101 359/13 |
| 5,521,443 A | | 5/1996 | Imura et al. |
| 7,291,420 B2 | | 11/2007 | Bitsche et al. |
| 7,572,549 B2 | | 8/2009 | Wegner |
| 7,951,477 B2 | | 5/2011 | Wood et al. |

(Continued)

FOREIGN PATENT DOCUMENTS

| | | |
|---|---|---|
| DE | 10 2011 006478 A1 | 10/2012 |
| DE | 10 2011 087336 A1 | 5/2013 |

(Continued)

OTHER PUBLICATIONS

U.S. Appl. No. 15/468,584, filed Mar. 24, 2017, Non-Final Rejection dated May 19, 2017, all pages.

(Continued)

*Primary Examiner* — Hongmin Fan
(74) *Attorney, Agent, or Firm* — Kilpatrick Townsend & Stockton, LLP

(57) ABSTRACT

A vehicle system includes a battery and a power indicator system. The power indicator system includes an external indicator visible on an outer surface of a vehicle that shows a battery condition. The system includes a sensor that detects the battery condition, and a processor that receives a first signal from the sensor indicative of the battery condition. The processor controls the external indicator in response to the first signal to visually display the battery condition.

14 Claims, 2 Drawing Sheets

(56) References Cited

U.S. PATENT DOCUMENTS

| | | |
|---|---|---|
| 8,263,250 B2 | 9/2012 | Hermann |
| 8,863,542 B2 | 10/2014 | Damsohn et al. |
| 8,871,371 B2 | 10/2014 | Song |
| 9,151,545 B2 | 10/2015 | Soukhojak et al. |
| 9,614,263 B2 | 4/2017 | Yang et al. |
| 2009/0021364 A1* | 1/2009 | Frey ............... B60L 3/0069 340/468 |
| 2011/0151315 A1 | 6/2011 | Masson et al. |
| 2011/0258845 A1 | 10/2011 | Wells et al. |
| 2013/0218458 A1* | 8/2013 | Scholl ................. G08G 1/0962 701/426 |
| 2013/0278402 A1* | 10/2013 | Rothschild ............ B60Q 1/50 340/425.5 |
| 2014/0205893 A1 | 7/2014 | You et al. |
| 2014/0214242 A1 | 7/2014 | Seo et al. |
| 2014/0343750 A1 | 11/2014 | Minemura et al. |
| 2014/0379174 A1* | 12/2014 | Holub ................. B60R 25/00 701/2 |
| 2015/0022994 A1* | 1/2015 | Bingle .................. G01D 13/20 362/23.1 |
| 2015/0039391 A1* | 2/2015 | Hershkovitz ......... G06Q 10/04 705/7.31 |
| 2015/0044519 A1 | 2/2015 | Rief et al. |
| 2015/0104689 A1 | 4/2015 | Frias et al. |
| 2016/0352107 A1* | 12/2016 | Yoshida ................ H02J 7/14 |
| 2016/0363991 A1* | 12/2016 | Schlecht ............... G06F 3/011 |

FOREIGN PATENT DOCUMENTS

| | | |
|---|---|---|
| EP | 3 118 050 A2 | 1/2017 |
| JP | 407032913 * | 2/1995 |

OTHER PUBLICATIONS

U.S. Appl. No. 15/468,622, filed Mar. 24, 2017, Non-Final Rejection dated May 18, 2017, all pages.
U.S. Appl. No. 15/468,799, filed Mar. 24, 2017, Non-Final Rejection dated May 15, 2017, all pages.
U.S. Appl. No. 15/468,696, filed Mar. 24, 2017, Non-Final Rejection dated May 18, 2017, all pages.
European Search Report for EP 17189773 dated Jan. 25, 2018, 9 pages.

* cited by examiner

INDICATOR SYSTEM FOR VEHICLE POWER

CROSS-REFERENCE TO RELATED APPLICATION

This application is a nonprovisional of and claims priority to U.S. Provisional Application No. 62/384,298, filed Sep. 7, 2016, the entire contents of which are hereby incorporated by reference for all purposes.

FIELD OF THE INVENTION

The disclosure generally relates to electric vehicles.

BACKGROUND OF THE INVENTION

Electric vehicles are growing in popularity as society becomes more and more concerned about carbon emissions and sustainable/renewable energy sources. Electric vehicles operate using electric power stored in one or more batteries. During operation, the stored electrical energy is controllably released to drive an electric motor. The electric motor converts the electrical energy into mechanical energy, which propels the vehicle. As electric vehicles become more common, the supporting infrastructure continues to grow. For example, charging stations are being built with electrical connectors for charging electric vehicle batteries. These charging stations may be located at stores, traditional gas stations, places of interest (e.g., museums, parks), at meter maids, etc. The process of charging an electric vehicle battery may take time, which enables drivers and passengers to buy products in a neighboring convenience stores, walk around, etc. While the driver and/or passengers relax, shop, etc. they may not be aware when the battery is charged, or when the battery contains enough charge to continue on the trip.

BRIEF SUMMARY

The embodiments discussed below include a power indicator system that enables a driver to visually determine a battery condition (e.g., charge level, time to full charge) when outside of their vehicle. The power indicator system displays the battery condition with an external power indicator. The external power indicator may be a display such as a heads up display on one of the windows of the vehicle or a separate display on another part of the vehicle. In some embodiments, the external power indicator may include one or more lights that indicate the battery condition.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
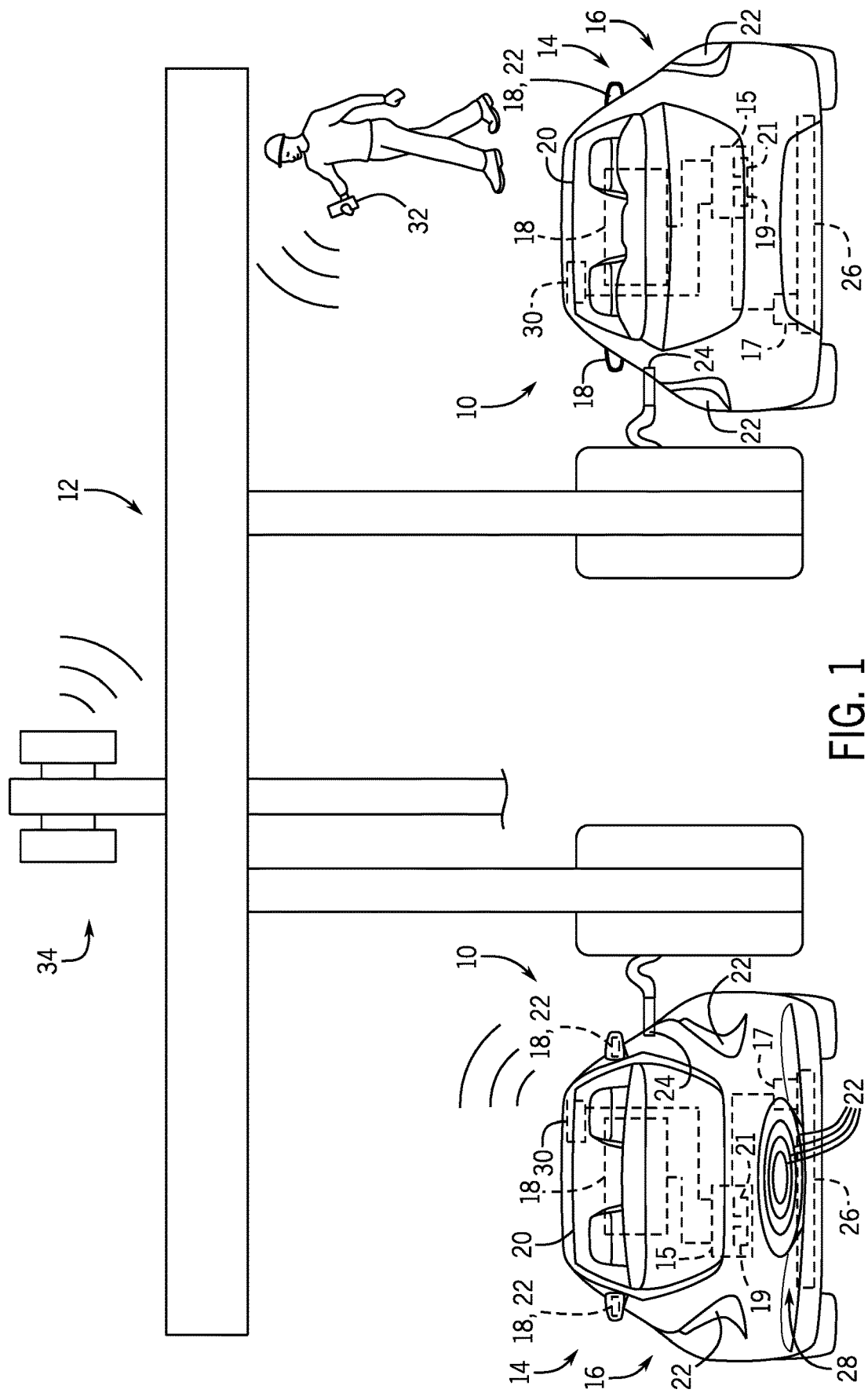
FIG. 1 is a side view of an embodiment of electric vehicles charging at a charging station.

FIG. 1 is a side view of an embodiment of electric vehicles 10 charging at a charging station 12. While the electric vehicles 10 illustrated in FIG. 1 are cars, the term electric vehicles may include cars, trucks, motorcycles, mopeds, bicycles, buses, etc. Electric vehicles store electrical energy in an onboard battery or batteries. In operation, electric vehicles release electrical energy stored in the battery to drive an electric motor. The electric motor converts the electrical energy into mechanical energy, which then propels the vehicle. As the electric motor draws electrical energy from the battery, the battery loses power and is eventually unable to sustain operation of the electric motor. In order to recharge the battery, the electric vehicle 10 couples to a power source, such as at a charging station 12, at home, on a street, parking lots, and other locations.

However, because electric vehicles include a large battery or batteries, recharging the battery may take more time than it takes to pump gas into traditional vehicles using an internal combustion engine. Accordingly, the driver may have additional time before the vehicle 10 is ready to go, which enables the driver to do other things while waiting. For example, the driver may shop at nearby stores, eat at neighboring restaurants, get coffee at a convenience store, exercise, visit a location of interest (e.g., museum), etc. While enjoying these activities the driver may want to periodically check on the charging progress of the battery. However, climbing inside of the vehicle and/or turning on the vehicle to determine the battery charge is inconvenient because the driver may need to stop their activity or take time away from the activity to check on the battery status.

In FIG. 1, the electric vehicles 10 includes a power indicator system 14 capable of externally displaying battery information so that a driver can check the battery status without climbing into and/or turning the vehicle on. For example, the power indicator system 14 may provide information such as current power level, time to full charge, time to charge the battery to a specific charge level, or a combination thereof. This enables a driver and/or passenger to quickly determine the battery status of the vehicle 10.

The power indicator system 14 includes a controller 15 that controls operation of one or more external indicators 16 (e.g., display 18, lights 22) using feedback from one or more sensors 17. In operation, the sensor(s) 17 detects the charge of the battery, which the controller 15 uses to determine changes in battery charge. The controller 15 includes one or more processors 19 that execute instructions stored on one or more memories 21 based on the detected battery charge and/or change in battery charge. In some embodiments, the displays 18 may be heads-up displays that create an image on one or more windows 20 of the electric vehicle 10. In FIG. 1, the vehicle 10 on the left includes a display 18 on the front windshield 20 while the vehicle 10 on the right includes a display on the rear window 20. It should be understood that while only one display can be seen on the vehicles 10, multiple windows 20 (e.g., side windows, rear windows, sunroof, moon roof, windshield, or a combination thereof) may include a display 18. Furthermore in some embodiments, each window 20 may include multiple displays 18 (e.g., one display 18 shows time elapsed since charging began, one display 18 show the battery condition, and another display 18 shows a countdown until fully charged).

The displays 18 may also be located on the vehicles 10 in locations other than on the windows. For example, one or more displays 18 may be located on the body of the vehicle 10 (e.g., hood, side, doors, roof, tail/trunk), on the side mirrors, etc. In some embodiments, the vehicle 10 may include a display 18 next to a charging port 24.

In addition to displays 18 on the windows 20 and/or other locations on the vehicle 10, the power indicator system 14 may use lights 22 to communicate battery information to the driver. These lights 22 are similarly controlled by the controller 15 with the processor(s) 19 executing instructions stored on the memory/memories 21. In some embodiments, the lights 22 may operate in combination with the displays 18 or alone. The lights 22 may include lights that are traditionally on vehicles such as headlights, taillights, brake lights, fog lights, turn signal lights, etc. These traditional lights 22 have specific colors such as red for brake lights, orange for turn signals, and white for headlights. However, while charging the electric vehicle 10 these lights 22 may emit a different color. For example, these lights 22 may emit a color indicative of the charge contained in the battery 26. In some embodiments, if the battery 26 contains less than 20% of its maximum charge one or more lights on the vehicle 10 may emit a red color (e.g., headlights, tail lights, turn signal lights may all emit the color red). If the battery charge is between 20-60%, the lights may emit an orange color (e.g., headlights, taillights, turn signal lights may all emit the color orange). If the battery 26 has a charge between 60-80%, the lights may emit a green color (e.g., headlights, taillights, turn signal lights may all emit the color green). And if the battery 26 has a charge between 80-100% the lights may emit a blue color (e.g., headlights, taillights, turn signal lights may all emit the color blue). The colors associated with these ranges may differ and may include additional colors for additional ranges. For example, colors such as purple, pink, turquoise, etc. may be used in lieu of or in combination with the colors discussed above. The ranges associated with specific colors may also change (e.g., less than 19%=red, 20-40%=orange, 41-60%=yellow, 61-80%=green, 81-100%=blue).

In some embodiments, the intensity of the light 22 may increase or decrease depending on the battery charge. For example, if the range of 20-40% battery charge is represented by the color orange, the intensity of the orange may decrease the closer the charge is to 40%. In some embodiments the exact opposite may occur, that is the intensity of the orange may increase the closer the charge is to 40%. In some embodiments, the lights 22 may be constantly on while charging to facilitate quick and easy recognition of the battery charge or they may periodically flash. For example, the lights may flash every 1, 2, 3, 4, 5, 6, 7, 8, 9, 10 seconds, etc. The lights 22 may also flash in intervals (e.g., 3 flashes every 5 seconds). In some embodiments, the lights 22 may only flash during the day and remain constantly on at night in order to avoid disturbing/surprising neighboring traffic at night.

In some embodiments, lights 22 may be have a specific shape unique to the vehicle 10. For example, the lights 22 may be formed into a company logo (e.g., Thunder Power symbol). As illustrated in FIG. 1, the vehicle 10 on the left includes lights 22 that are in concentric oval or circular rings 28. In some embodiments, the lights 22 in these rings 28 may all emit the same color, which corresponds to a specific battery charge range. These lights 22 may change as the battery charge changes. To differentiate within the range, the lights 22 in the rings 28 may emit a more intense shade of the color (e.g., green, blue, orange, yellow, red, etc.). For example, all the lights 22 in the rings 28 may increase in intensity or some of the lights 22 may change in intensity (e.g., the lights 22 in the rings 28 may increase in intensity from the outermost ring 28 to the inner most ring 28 as the battery charge changes within a range, or the lights 22 in the rings 28 may increase in intensity from the innermost ring 28 to the outermost ring 28 as the battery charge changes within a range).

In some embodiments, some of the rings 28 may turned on to differentiate within the range. For example, each ring 28 may represent a percentage within the range, and as the battery charges within the range the controller 15 progressively turns on more rings 28 (e.g., each ring may represent 5% charge). In other embodiments, each ring 28 may emit a specific color that corresponds to a battery charge range (e.g., outermost ring is blue while the innermost ring is red). Accordingly, the amount of battery charge may determine which rings 28 are turned on and what color it is.

As explained above, it make take time to fully charge the battery 26 and a driver may not want to wait until the battery is fully charged before continuing on their trip. Instead of guessing if the battery 26 has sufficient to charge to reach an intended destination(s), the power indicator system 14 may determine if the battery 26 has enough charge to reach the destination(s) and/or how much additional charge is necessary. To do so, the controller 15 may receive an intended destination(s) by the driver or passenger through an interface in the vehicle 10 (e.g., a touchscreen) and/or through a portable electronic device (e.g., a cellphone, watch, laptop, tablet, etc.). The controller 15 may then communicate with a GPS unit in the controller 15 or otherwise coupled to the controller 15 to determine the present location of the vehicle 10. Using input from the GPS unit, the controller 15 may determine the distance(s), projected drive time to reach the destination(s), amount of battery charge needed to reach the destination(s), etc. The controller 15 may then compare the amount of charge needed to reach the destination(s) with the current charge in the battery 26.

If the charge is adequate, the controller 15 controls the displays 18 and/or lights 22 to inform the driver that the vehicle 10 is ready to go. For example, if the vehicle 10 is capable of reaching the intended destination, display(s) 18 may provide a written message (e.g., "Ready," "All Set To Go") and/or a symbol (e.g., thumbs up, smiley face, picture of the destination, check mark). Similarly, if the vehicle 10 is unable to reach the destination(s) the display 18 may provide a written message (e.g., "Charging") and/or a symbol (e.g., a countdown until the charged, warning symbol).

The lights 22 may also indicate whether the vehicle 10 is capable of reaching the intended destination(s). For example, the lights 22 may flash (e.g., flash a specific color, certain number of times, or a combination thereof), remain a constant color, emit a color not associated with the charging scale (e.g., purple, pink, etc.), emit a plurality of colors (e.g., lights 22 having different colors may all turn on), etc., when the vehicle 10 is capable of reaching the destination(s). If the vehicle 10 is unable to reach the destination, the lights 22 may remain a specific color (e.g., red) and/or flash a specific color (e.g., red) until the battery 26 is sufficiently charged to reach the intended destination.

In some embodiments, the controller 15 may not trigger the displays 18 and/or lights 22 to indicate that the vehicle 10 is capable of reach the intended destination(s), until the battery 26 has reached a charge level above a threshold battery charge level needed to reach the destination(s). For example, the controller 15 may wait until the battery charge is 5%, 10%, 15%, 20%, 25% or greater than the threshold amount of charge needed to reach the destination(s) before indicating with the displays 18 and/or lights 22 that the vehicle 10 can reach the destination(s). By charging the battery 26 above the threshold level, additional charge is available to power the vehicle 10 during unintentional delays (e.g., traffic jams, wrong turns). In some embodiments, the controller 15 may stop the charging process once the desired charge is reached to prevent additional fees for charging the vehicle 10 (e.g., when charging away from home).

The vehicle 10 may also transmit a wireless message to the driver and/or passenger that indicates the battery status, time left until fully charged, whether the battery is charged enough to reach a desired destination(s), or a combination thereof. The message may include symbols, words, or a combination thereof. In order to transmit the message, the controller 15 may couple to a transmitter 30 capable of transmitting the message to an electronic device 32 (e.g., a cellphone, laptop, tablet, watch, electronic wristband, key fob) held or worn by the driver and/or passengers. For example, the transmitter 30 may be capable of communicating with cellphone towers 34, and/or able to broadcast another type of wireless signal (e.g., Bluetooth, Wi-Fi, mobile satellite communications, infrared) to the electronic device 32. For example, the driver may have a key fob capable of locking/unlocking the car, arming/disarming an alarm, as well as receive and display battery status updates. The key fob may display the battery status with lights 22 and/or a display 18. The vehicle 10 may automatically push these updates (e.g., send every second, 10 seconds, minute, half-hour, hour) to the key fob. In some embodiments, the vehicle 10 may send the update automatically when the battery 26 is charging, and/or anytime in response to a request from the key fob (e.g., the driver pushes a button on the key fob that transmits a signal requesting a battery status update).

Figure 2:
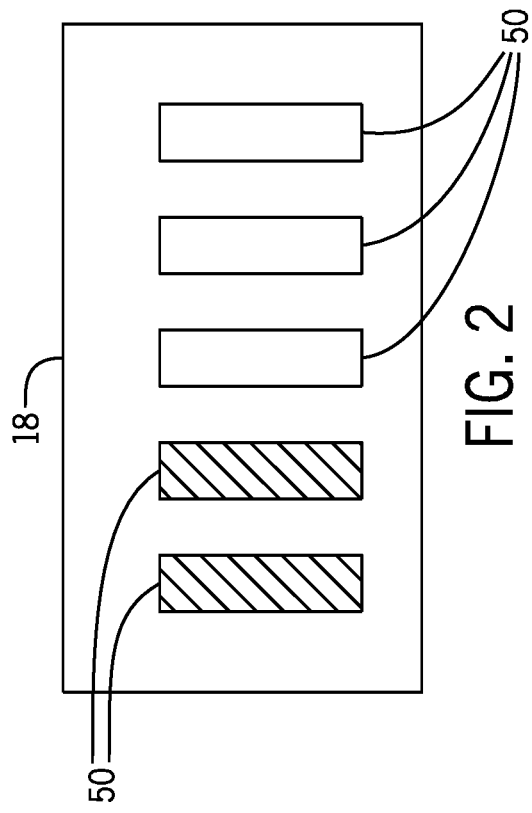
FIG. 2 is an embodiment of an external indicator that indicates the condition of an electric vehicle battery.

FIG. 2 is an embodiment of a display 18 that displays a condition of an electric vehicle battery 26. As explained above, the display 18 may be a heads-up display or another kind of display (e.g., LED, OLED, LCD, PLASMA, etc.). In FIG. 2, the display 18 creates bars 50 that represent a percentage of the complete charge of the battery 26. In the illustrated embodiment, there are seven bars 50 with two of the bars filled to represent the current charge of the battery 26. As the battery 26 charges additional bars 50 fill to represent the battery charge. While seven bars 50 are illustrated, other embodiments may have different numbers of bars 50 (e.g., 3, 5, 10, 15, 20, 50, 100, etc.).

In some embodiments, the bars 50 may change in color (e.g., change from red to orange to yellow to green to blue) as the battery 26 charges. For example, all the bars 50 may change in color or some of the bars 50 may change in color. As an example, the first two bars 50 may be red, the next two orange, the following one yellow, the next one green, and the final one blue. In some embodiments, once the battery 26 is fully charged the entire display 18 may turn a specific color (e.g., blue). While bars 50 are shown, other possibilities include, concentric circles or ovals; a pie chart symbol (e.g., that changes with charge), a gradient image of colors that gradually progresses across the display 18 (e.g., left to right, right to left, top to bottom, bottom to top, center to outside, outside to center).

Figure 3:
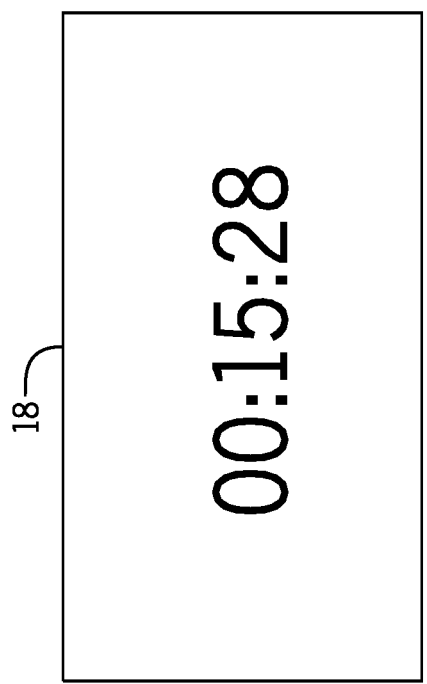
FIG. 3 is an embodiment of an external indicator that indicates the condition of an electric vehicle battery.

FIG. 3 is an embodiment of a display 18 that displays a condition of an electric vehicle battery 26. In FIG. 3, the display 18 displays a timer. In operation, the controller 15 may continuously count the time since the battery 26 began charging. The controller 15 then sends a signal to the display 18 that then displays the information as a timer. In some embodiments, the controller 15 may calculate how much time remains until the battery is completely charged using feedback from the sensor. And in some embodiments, instead of fully charging the battery 26, a driver may charge the battery 26 to a level that enables them to travel to the next destination(s). In this situation, the controller 15 may calculate the time remaining until the battery 26 has enough charge to enable travel to those destinations. In still another embodiment, the display 18 may display multiple timers to assist the driver (e.g., timer until battery 26 is fully charged, timer until battery 26 is charged to a specific level, and/or a timer indicating how long the battery 26 has been charging).

Figure 4:
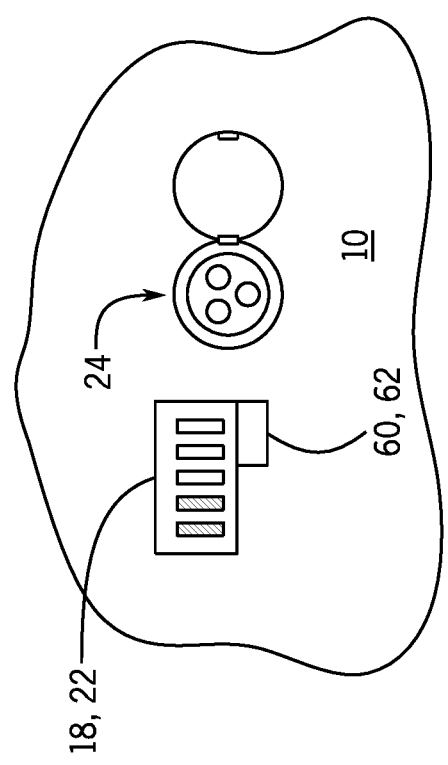
FIG. 4 is partial view of a vehicle with an external indicator that indicates the condition of the electric vehicle battery.

FIG. 4 is a partial view of an electric vehicle 10 with a display 18 or lights 22. As explained above, the display 18 or lights 22 may be located at various places on the exterior surface of the vehicle 10. For example, the display 18 or lights 22 may be positioned on a side of the vehicle 10 next to the charging port 24. In this position, the display 18 may provide a quick and easy battery status reference to a driver before, during, and after charging the battery 26. For example, the driver may check the battery status before connecting the charging port 24 to a power source, as well as when the charging port 24 is disconnected from the charging source. The display 18 in FIG. 4 may couple to an exterior surface of the vehicle 10 or couple to the perimeter of an aperture in an exterior surface of the vehicle 10. In some embodiments, a button 60 may be placed on the exterior of the vehicle 10 that activates the display 18 or lights 22 so that the display 18 or lights 22 are not constantly on. In some embodiments, the controller 15 may couple to a motion sensor 62. In operation, the controller 15 activates the display 18 and/or lights 22 in response to a signal from the motion sensor 62 detecting motion.

Figure 5:
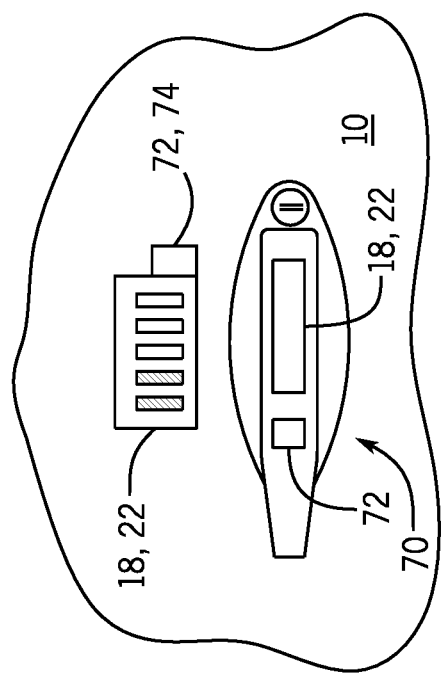
FIG. 5 is partial view of a vehicle with an external indicator that indicates the condition of the electric vehicle battery.

FIG. 5 is an embodiment of a display 18 or lights 22 that indicate the condition of an electric vehicle battery 26. As explained above, the display 18 and/or lights 22 may be located at various places on the exterior surface of the vehicle 10. In FIG. 5, the display 18 or lights 22 may be positioned on or next to a door handle 70. In some embodiments, the door handle 70 may be the driver's door handle 70. In this position, display 18 or lights 22 may enable a driver to quickly determine the charge of the battery 26 before getting into the vehicle 10, starting the vehicle 10, connecting the charging port 24 to a power source, and/or disconnecting the charging port 24 from a power source. In some embodiments, the display 18 or lights 22 may be activated by touching the door handle 70 and/or pulling/ pushing the door handle 70. In some embodiments, a driver may push or touch a button 72 to activate the display 18 and/or lights 22. And in some embodiments, the controller 15 may couple to a motion sensor 74. In operation, the controller 15 activates the display 18 and/or lights 22 in response to a signal from the motion sensor 74 detecting motion.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A vehicle system, comprising:
    a battery;
    a power indicator system, comprising:
        multiple external lights configured to implement an external indication to display a battery condition, wherein the external lights include at least a headlight, a taillight and a turn signal light;
        a button press-able such that when pressed, the external indicator is activated to display the battery condition;
        a sensor configured to detect the battery condition;
        a motion sensor configured to detect a motion around the vehicle,
        a processor configured to:
            receive a first signal from the sensor indicative of the battery condition;
            receive a second signal indicating a destination for the vehicle;
            receive a third signal indicating the button is pressed;
            determine whether the current charge level of the battery is adequate for the vehicle to reach the destination based on the battery condition and the destination;
            control the external indication in response to the second signal and third signal to visually display to a user of the vehicle whether a current charge level of the battery is adequate for the vehicle to reach the destination, wherein the indication includes emitting a blue light through all of the multiple external lights to indicate the current level of the battery is between 80% to 100%; and
            control the external indicator, in response to the motion sensor detecting the motion around vehicle, to visually display to a user of the vehicle whether a current charge level of the battery is adequate for the vehicle to reach the destination.

2. The vehicle system of claim 1, wherein determining whether the current charge level of the battery is adequate for the vehicle to reach the destination based on the battery condition and the destination comprises:
    determining a distance to be traveled by the vehicle to reach the destination;
    determine a time duration for the vehicle to travel the distance; and
    determine whether the current charge level of the battery is adequate for the vehicle to reach the destination further based on the time duration.

3. The vehicle system of claim 1, wherein the external indicator is on at least one side mirror.

4. The vehicle system of claim 1, wherein the external indicator surrounds an external charging port on the vehicle.

5. The vehicle system of claim 1, wherein the external indication further includes emitting a green light through all the multiple external lights when the current charge level of the battery is between 60% to 80%.

6. The vehicle system of claim 1, wherein the external indicator displays a timer that indicates a time remaining to at least one of a full charge and a desired charge level.

7. The vehicle system of claim 1, comprising a transmitter configured to send a third signal to a remote electronic device, wherein the third signal indicates whether the current charge of the battery is adequate charge for the vehicle to reach the destination.

8. The vehicle system of claim 7, wherein the remote electronic device is a key fob.

9. The vehicle system of claim 7, wherein the remote electronic device is a cellphone.

10. The vehicle system of claim 1, wherein the external indicator is a heads-up display system on at least one window.

11. The vehicle system of claim 1, wherein the processor is configured to stop charging the battery when a threshold level of battery charge is reached, and wherein the threshold level is less than a complete battery charge.

12. The vehicle system of claim 1, wherein the external indication further includes emitting a red light through all the multiple external lights when the current charge level of the battery is below 20%.

13. The vehicle system of claim 1, wherein the external indication further includes emitting a yellow light through all the multiple external lights when the current charge level of the battery is between 20%-60%.

14. The vehicle system of claim 1, wherein the external indication further includes emitting lights through the multiple external lights to form a logo when the current charge level of the battery is above a threshold.

\* \* \* \* \*